UNITED STATES PATENT OFFICE.

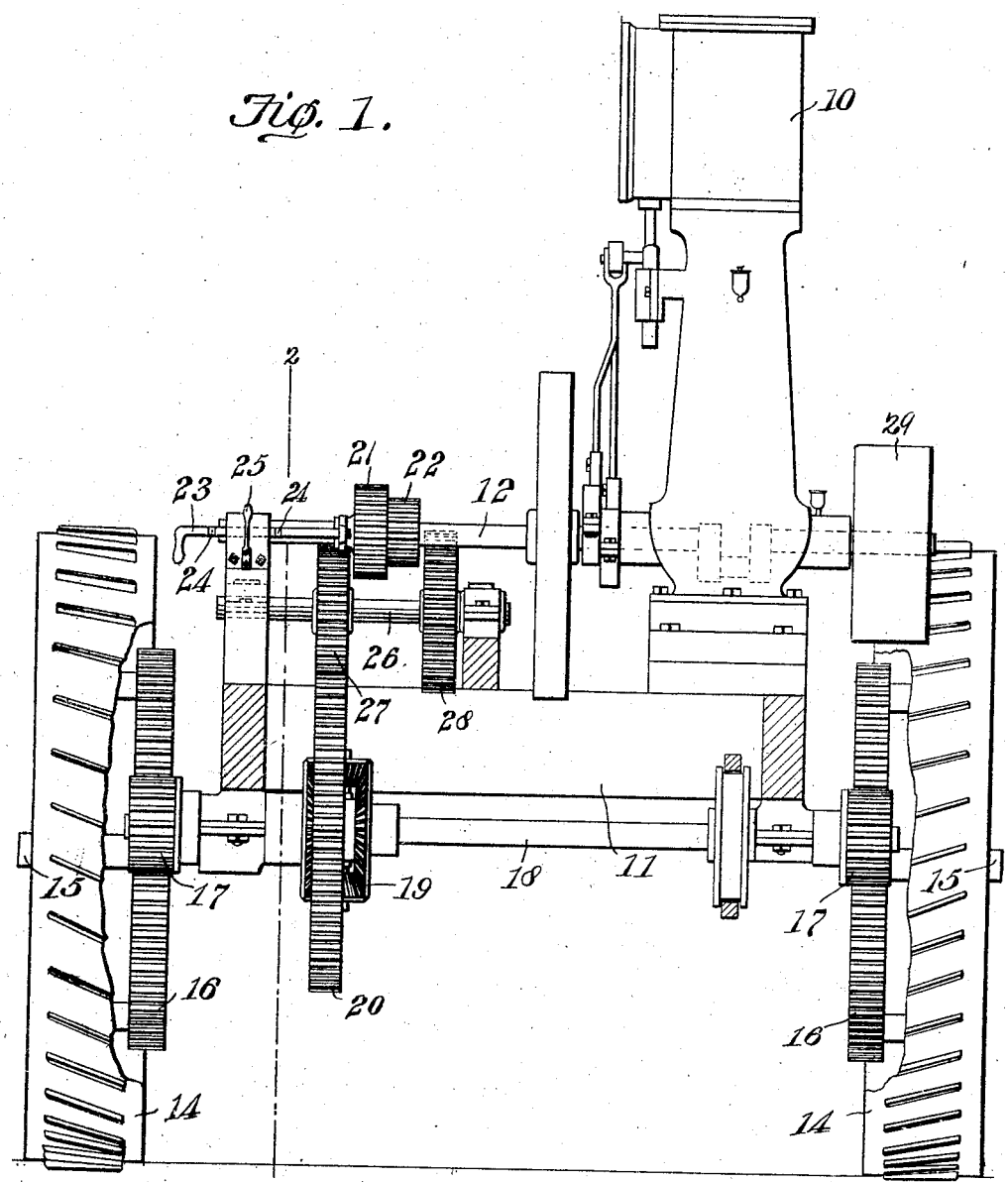

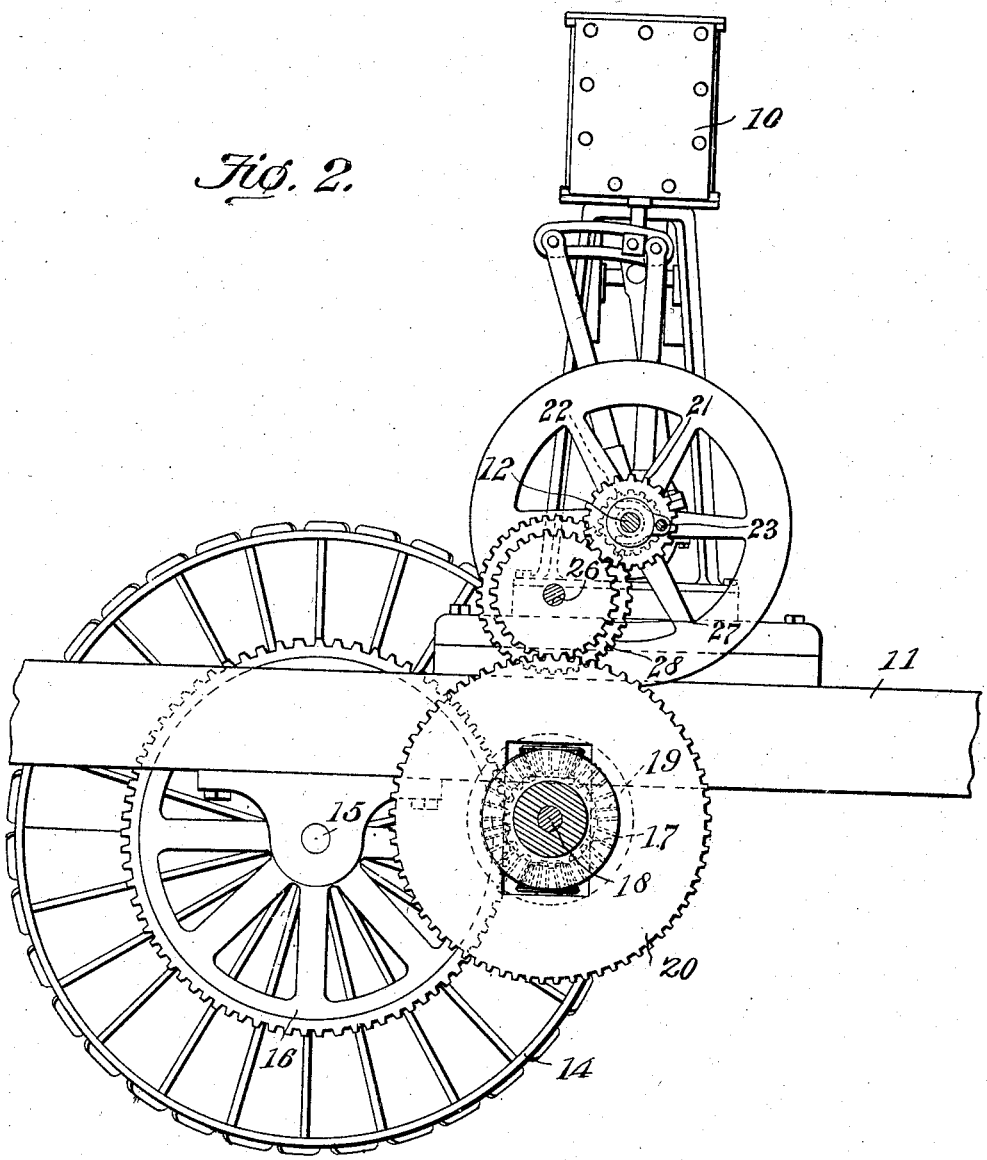

GEORGE DUDLEY LOOMIS, OF TIFFIN, OHIO.

TRACTION-ENGINE.

No. 866,042.　　　　Specification of Letters Patent.　　　Patented Sept. 17, 1907.

Application filed December 21, 1905. Serial No. 292,783.

*To all whom it may concern:*

Be it known that I, GEORGE DUDLEY LOOMIS, a citizen of the United States, residing at Tiffin, in the county of Seneca and State of Ohio, have invented a new and useful Traction-Engine, of which the following is a specification.

This invention relates to traction engines, and has for its principal object to improve and simplify the construction and arrangement of the engine and traction mechanism, so that the fewest possible number of gears may be in mesh while the engine is employed for propelling the machine, and all of the gears in motion will be out of mesh when the engine is used for other purposes; that is to say, for operating a well drilling apparatus.

A further object of the invention is to provide a simple form of gearing connection between the propelling engine and driving shaft of the vehicle, and to permit the ready changing of speed when desired.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size and minor details of the structure may be made without departing from the spirit or sacrificing any of the advantages of the invention.

In the accompanying drawings:—Figure 1 is a transverse sectional view through the rear portion of a traction machine, illustrating a traction mechanism constructed and arranged in accordance with the invention. Fig. 2 is a sectional elevation of the same on the line 2—2 of Fig. 1.

Similar numerals of reference are employed to indicate corresponding parts throughout the several figures of the drawings.

While the apparatus forming the subject of the present invention is applicable to all forms of traction engines, it is found of especial value for use in devices of that general class in which a derrick and drill operating mechanism are supported on a wheeled frame, and driven by a steam or other engine, usually located at the rear of the frame, the engine being employed for propelling the vehicle to and form the field of operation, and thereafter being utilized for manipulating the drilling mechanism.

In the present case the engine 10, which may be of any desired construction, is supported on the frame 11, and the engine is provided with a main or counter shaft 12, that extends transversely across the whole width of the frame. The frame is provided with suitable supporting wheels, including traction wheels 14, which are carried by axle members 15, and to each of these wheels is secured a master wheel 16. The master wheels are in mesh with pinions 17 on a shaft 18 that is connected by compensating gearing 19 to a large gear 20, and said gear 20 is revolved from the engine at different speeds, in order to propel the vehicle.

On the main shaft 12 is feathered a double pinion 21—22, the two pinions being adjustable longitudinally of the shaft by means of a handled rod 23 that is provided with notches 24 for the reception of a spring locking lever 25 which is utilized to hold the gears in any position to which they may be adjusted, or the pinions may be separate from each other and adjusted independently.

Arranged below the shaft 12 are bearings for the support of a counter-shaft 26 arranged parallel with the shaft 12, and provided with two gears 27 and 28, the gear 27 being much smaller in diameter than the gear 28, and being arranged to mesh with the larger pinion 21, while the gear 28 may mesh with the smaller pinion 22.

When the parts are in the position shown in Fig. 1, both pinions 21 and 22 are out of mesh with the propelling gears, and the rotations of the shaft 12 may then be imparted through a drive pulley 29 to the drilling mechanism near the opposite end of the frame, or to any other mechanism which it may be desired to operate, and the engine is free to run without any gears in mesh, or any unnecessary wear or friction on any of the parts.

When the apparatus is to be propelled to or from the field of operation, the rod 23 is moved to engage the pinion 22 with the gear 28, or the pinion 21 with the gear 27. When the pinion 22 is in mesh with the pinion 28, movement will be transmitted through the countershaft to the main shaft 18, and the apparatus will be propelled at slow speed. To increase the speed, the rod 23 is pulled outward until pinion 22 leaves the gear 28, and the pinion 21 intermeshes with the gear 27, the diameters of the gears in mesh being such that the apparatus will then be propelled at greater speed.

It will be observed that when used for propelling purposes, only one set of driving gears is in mesh at one time, and there are no idle gears constantly in mesh to produce unnecessary wear and friction, and while the engine is employed for other purposes, all of the meshing gears remain stationary and no gears are held while their shafts rotate within them, so that there is no unnecessary friction to absorb any of the power of the engine.

In some cases it may be preferred to employ a clutching means between the shaft 12 and the double pinion 21—22, so that when the engine is being operated for the purpose of moving the well drilling mechanism or for other purposes, said pinions will not be rotated.

I claim:—

1. A portable apparatus including an engine capable of use for traction and power purposes, and comprising an engine driven shaft, a propelling shaft from which movement is imparted to the vehicle wheels, a counter-shaft, a pair of gears carried thereby, one of such gears being in constant mesh with a gear of the propelling shaft, pinions of different diameter respectively on the engine driven shaft, and means for adjusting said pinions to engage one or other of them with a gear of the counter-shaft or to an idle position out of mesh with either of the counter-shaft gears when the engine is to be employed for power purposes.

2. A portable apparatus including an engine capable of use for traction or power purposes and comprising an engine driven shaft, a propelling shaft through which movement is imparted to the driving wheels of the vehicle, a counter-shaft, a pair of gears of different diameter, respectively mounted on the counter-shaft, a gear connected by compensating mechanism to the propelling shaft and permanently in mesh with one of the gears of the counter-shaft, a pair of adjustable pinions carried by the engine driven shaft and of different diameters, respectively, said pinions being movable longitudinally of the engine driven shaft into mesh with the counter-shaft gears, and being adjustable to an idle position out of mesh with any of the gears when the engine is to be employed for power purposes.

3. A portable apparatus including an engine capable of use for traction or power purposes and comprising an engine driven shaft extending transversely of the frame of the apparatus, a pair of pinions of different diameters, respectively, mounted on the shaft and adjustable longitudinally thereof, a traction shaft operatively connected to the traction wheels of the apparatus, and carrying a gear wheel, a counter-shaft, a pair of gears of different diameters, respectively, permanently secured to the counter-shaft, one of said gears being in constant mesh with the gear of the traction-shaft, and means for adjusting the pinions to engage one or other of them with a counter-shaft gear, or to an idle position between such counter-shaft gears when the engine is to be employed for power purposes.

4. A portable apparatus including an engine capable of use for traction or power purposes and comprising an engine driven shaft extending transversely of the frame of the apparatus, a traction shaft having gearing connections with the traction wheels of the apparatus and provided with a large gear, and adjustable gearing connections between the engine driven shaft and said large gear to change the speed of travel of the apparatus, such gearing connections being adjustable to an idle position to permit free rotation of the engine shaft when the apparatus is stationary and the engine is to be employed for power purposes.

5. A portable apparatus including an engine capable of use for traction or power purposes and comprising an engine driven shaft from which power may be transmitted for drilling or other purposes, master wheels carried by the traction wheels of the apparatus, a traction shaft having pinions intermeshing with the master wheels, a large gear carried by the traction shaft and connected thereto through compensating gearing, a counter-shaft arranged parallel with the engine driven shaft and having a pair of gears of different size, one of such gears being in constant mesh with said large gear, and a pair of pinions of different diameters, respectively, mounted on the engine driven shaft and adjustable to engage one or other of them with the gears on the counter-shaft or to an idle position out of mesh with any gears when the engine is to be employed for power purposes, and means for locking said pinions in adjusted position.

In testimony that I claim the foregoing as my own, I have hereto affixed my signature in the presence of two witnesses.

GEORGE DUDLEY LOOMIS.

Witnesses:
 D. L. LOOMIS,
 E. R. GOOD.